United States Patent [19]
Basso et al.

[11] Patent Number: 5,386,482
[45] Date of Patent: Jan. 31, 1995

[54] ADDRESS BLOCK LOCATION METHOD AND APPARATUS

[75] Inventors: Alfred L. Basso, Colebrook; David A. Newton, Coventry, both of Conn.

[73] Assignee: Scan-Optics, Inc., East Hartford, Conn.

[21] Appl. No.: 915,008

[22] Filed: Jul. 16, 1992

[51] Int. Cl.$^6$ ............................................. G06K 9/00
[52] U.S. Cl. ................................. 382/9; 358/453; 382/1; 382/48
[58] Field of Search ................. 382/9, 18, 61, 48; 358/453

[56] References Cited

U.S. PATENT DOCUMENTS

| | | | |
|---|---|---|---|
| 4,933,984 | 6/1990 | Nakano et al. | 382/61 |
| 4,949,392 | 8/1990 | Barski et al. | 382/18 |
| 5,025,484 | 6/1991 | Yamanari et al. | 382/61 |
| 5,038,392 | 8/1991 | Morris et al. | 382/61 |
| 5,040,226 | 8/1991 | Elischer et al. | 382/18 |
| 5,086,480 | 2/1992 | Sexton | 382/18 |
| 5,119,433 | 6/1992 | Will | 382/61 |
| 5,123,062 | 6/1992 | Sanyo | 382/61 |

*Primary Examiner*—Joseph Mancuso
*Attorney, Agent, or Firm*—Chilton, Alix & Van Kirk

[57] ABSTRACT

A block of printed information, for example an address, is located on a moving page and data commensurate with the block only is transferred to downstream processing apparatus such as an optical character reader. The location of the block of information is accomplished by generating a real time binary profile of a data stream produced during scanning of the page and comparing the binary profile with a plurality of prerecorded profiles commensurate with the type of information to be located.

11 Claims, 2 Drawing Sheets

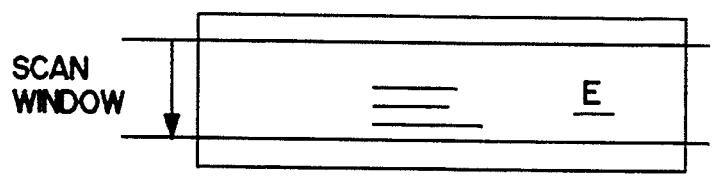
SCAN WINDOW
SCAN DIRECTION  FIG. 1A
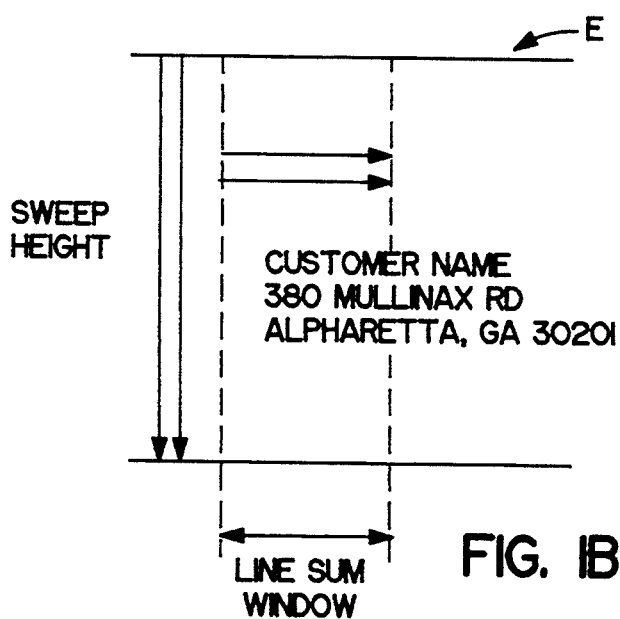
FIG. 1B
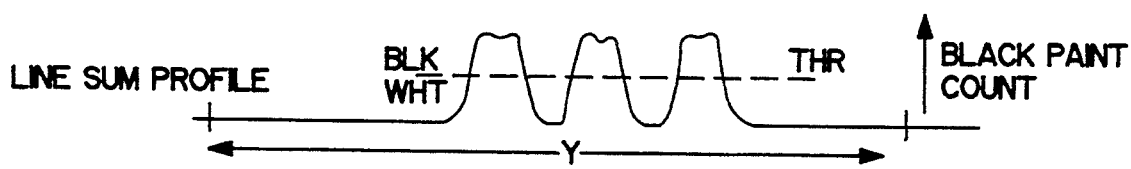
LINE SUM PROFILE
FIG. 1C
CORRELATOR INPUT
FIG. 1D
CORRELATOR PATTERN
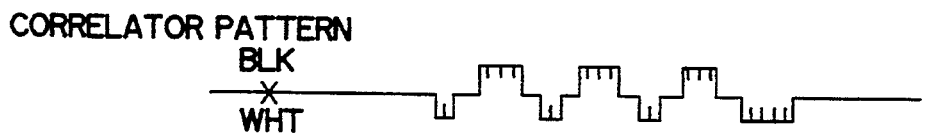
FIG. 1E

ADDRESS BLOCK LOCATION METHOD AND APPARATUS

BACKGROUND OF THE INVENTION

1. Field of the Invention

The present invention relates to optical character recognition and particularly to locating blocks of indicia on pages for subsequent processing of such indicia by optical character recognition techniques. More specifically, this invention is directed to apparatus for use in the machine reading of address information on envelopes, and especially to circuitry for locating address information on a moving envelope and subsequently outputting video data corresponding to a region on the envelope which includes the address information. Accordingly, the general objects of the present invention are to provide novel and improved methods and apparatus of such character.

2. Description of the Prior Art

While not limited thereto in its utility, the present invention is particularly well suited for incorporation in a mail processing system to facilitate the machine reading of address information from envelopes moving on a transport system. Mail processing systems which employ optical character recognition apparatus and techniques for "reading" address information are well known in the art. Such systems are, for example, employed to enable the automatic printing on the envelopes being "read" of a bar code commensurate with the addressee's postal zip code. In the known systems, envelopes will move along a transport path through a character recognition station where an image of the address information is "captured" by a "camera" for processing by the character recognition logic.

In order to enable the processing of pieces of mail at an acceptable speed, it has previously been necessary for the OCR apparatus to know with a reasonably high degree of precision the location, i.e., the field, on the envelope of the address information to be read. Restated, if the "X" and "Y" coordinates of an edge of the field in which the address to be read is located and the size of the address block are not known, the OCR apparatus will have to process an image of the entire envelope. The processing of the image of the entire envelope is a relatively time-consuming task. Accordingly, present mail processing systems will be configured to process similar envelopes where the address block is always in the same location and the window in video memory may thus be preset during a setup procedure. Present mail processing systems, accordingly, cannot process mixed mail pieces which have different address block locations.

SUMMARY OF THE INVENTION

The present invention overcomes the above-discussed and other deficiencies and disadvantages of the prior art by providing a method of and apparatus for automatically locating a block of indicia, for example an address block, in the image data commensurate with a page moving on the transport of an optical character recognition system. The present invention finds the address block on the page, an envelope for example, and then transfers a sub-window of the entire image, that sub-window corresponding to the address block, to a predetermined location in a memory. Once the sub-window is in the memory, the recognition control software will know the approximate location of the bottom line of the address block, and scanning of the characters comprised in the address may then proceed.

In the practice of the invention, a "video" data stream from the image acquisition device of the OCR system will be intercepted, and the image will be temporarily stored. The incoming video data stream will also be processed to produce a binary profile thereof. This binary profile is compared with predetermined address block patterns and a "score" recorded. When this scoring indicates that an address block has been scanned by the image acquisition device, the sub-window containing the address block will be transferred to downstream character recognition logic for further processing. In the course of this sub-window transfer, the bottom-left edge of the sub-window will be aligned near the bottom line of the address block and the recognition control software will, accordingly, know the approximate location of the bottom line of the address block.

BRIEF DESCRIPTION OF THE DRAWINGS

The present invention may be better understood, and its numerous objects and advantages will become apparent to those skilled in the art, by reference to the accompanying drawings in which:

FIGS. 1A through 1E are diagrammatic showings which will facilitate understanding of the operation of the present invention.

DESCRIPTION OF THE DISCLOSED EMBODIMENTS

Figure 2:
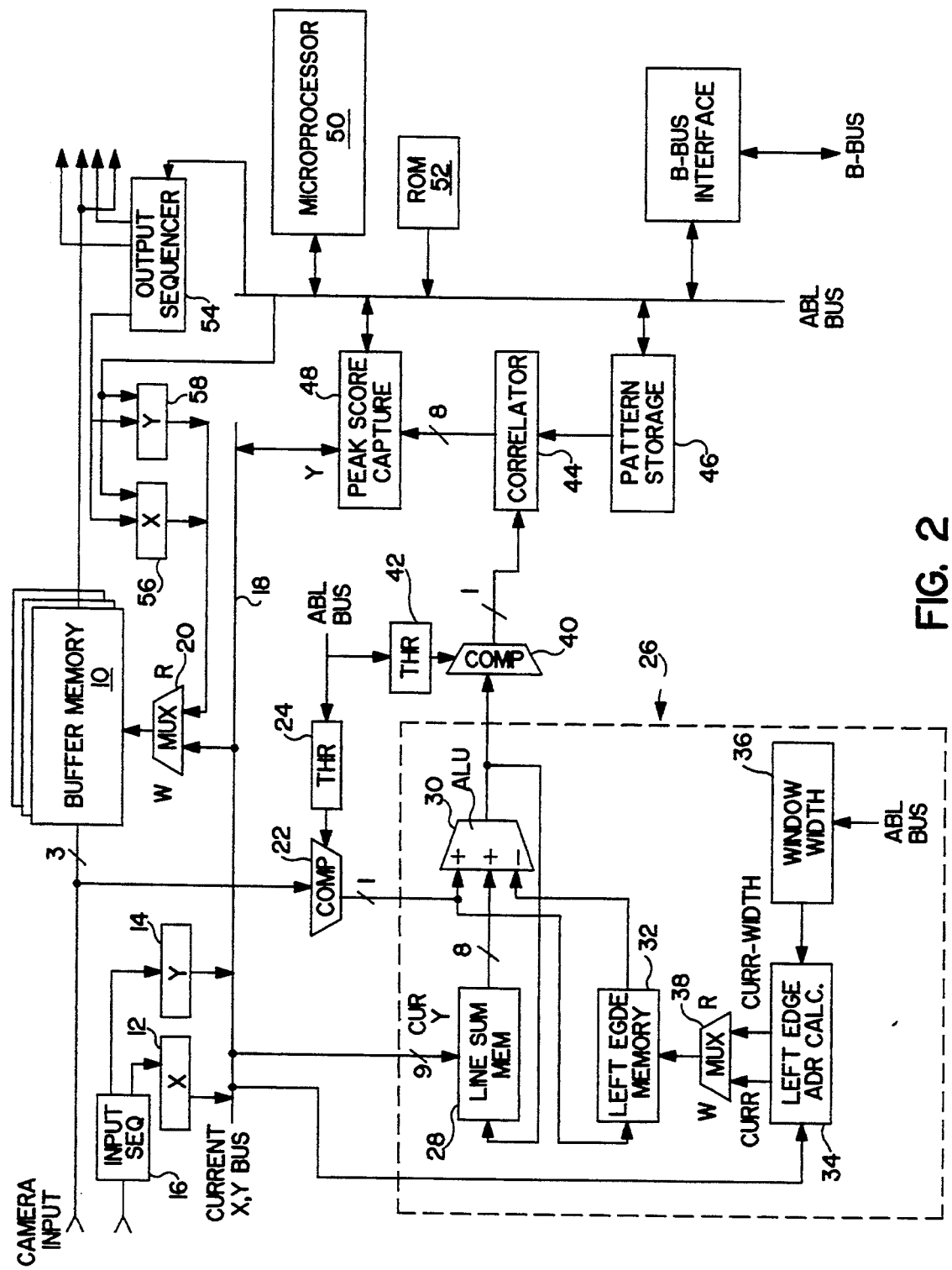
FIG. 2 is a functional block diagram of apparatus in accordance with a preferred embodiment of the invention.

FIG. 1A represents the manner in which the video data, for example the image of an envelope, is generated as the envelope moves in front of a line scan camera. The envelope, indicated at E in FIG. 1, will be moving from right to left on a transport device. In the disclosed embodiment, a 512 pixel scan proceeds from the top to the bottom of the envelope at a rate of up to 12.5 MHz. As this vertical scan takes place, the envelope moves in the horizontal direction. In a typical application, the optical magnification, sweep speed and transport speed are adjusted to give a pixel resolution of 200 per inch in both the "X" and "Y" directions. The 512 pixel scan window will typically be approximately 2.5 inches high.

Referring to FIG. 1B, and as will be explained in greater detail below in the discussion of FIG. 2, a black point sum is accumulated over a selected window width as the video data stream is received. The sum is kept for each of the 512 horizontal lines. As each new point is added on the right side of the window, the corresponding point on the left side is subtracted from the sum. These sums form a histogram of the black point counts over the line sum window width. With the line sum window positioned as shown in FIG. 1B, line sum profiles as represented in FIG. 1C will be generated. This technique of black point sum accumulation, in effect, constitutes a low pass filtering of the video data in the "X" dimension.

The line sum values are thresholded and converted into a binary valued data stream as represented by FIG. 1D. The binary valued data stream is a real time binary profile of the image being captured. This binary profile is applied to a correlator which is programmed to look for certain patterns. These patterns are based on the vertical pitch, in lines per inch, of an address block. A typical correlator pattern is depicted in FIG. 1E. The correlator patterns are employed to check the binary profile for white, black or "don't care" conditions at any bit position. The correlator will produce an output signal which is a count of how many bit positions of the incoming data stream match a programed correlator pattern.

When the output of the correlator "peaks", the current score and the "Y" position of the image scan will be stored. The stored information is then used to track the extent of the address block and to determine its "X", "Y" coordinates.

It is to be noted that, as the right edge of the envelope approaches the scanning line, the address block location logic may have recorded more than one potential address block location. Under such circumstances, the potential address block locations will be compared and, based upon predetermined criteria, the most likely address block will be selected. The only or the selected address block, i.e., a sub-window of the captured image containing the address block, will then be transferred to downstream apparatus for further processing including character recognition. In the sub-window transfer, the bottom left edge of the window will be aligned near the bottom line of the address block. In cases where the output window extends beyond the edge of the captured image, i.e., beyond the edges of the buffer memory in which the captured image has been temporarily stored, the "overflow" areas will be filled with white data.

Referring now to FIG. 2, "video" data from the image acquisition device is delivered, as the envelope E moves past the image acquisition device or "camera", to a three plane random access buffer memory indicated generally at 10. This incoming video data will be a single grey scale pixel serial data stream. The memory 10, in one reduction to practice, was 512 bites high by 2048 bites wide, allowing capture of a 2.56 by 10.24 inch image window. As will become obvious from the discussion below, in the disclosed embodiment, the memory 10 must be able to simultaneously write input pixels at up to a 12.5 MHz rate and read data to output at one half the input rate. Accordingly, in the disclosed embodiment, memory 10 is a dual ported static RAM array.

As pixels are received, current "X", "Y" counters 12 and 14 are incremented to point to the proper storage locations in memory 10. The counters 12 and 14 are synchronized with the scanning of the envelope by means of an input sequencer 16 which comprises a logic state machine. The outputs of the counters 12 and 14 are applied to a bus 18. Bus 18 is coupled to memory 10 via a multiplexer 20 and the write and read address information is thus delivered to memory 10 via multiplexer 20.

The received pixel data stream is delivered to a comparator 22 simultaneously with loading into RAM 10. In comparator 22, the grey scale pixel data is compared to a threshold level as provided by a threshold signal generator 24. Comparator 22 outputs single level data. This single level data will be indicative of whether or not the pixel corresponds to a black point, i.e., a portion of a printed character, on the envelope. The output of comparator 22 is delivered as an input to a line sum accumulator which has been indicated generally at 26. The line sum accumulator, in the disclosed embodiment, includes a line sum memory 28 in the form of a 512×8 FIFO. In the manner to be described below, memory 28 stores line sums for each of the 512 horizontal lines comprising the scan of the moving envelope. The line sum accumulator 26 also includes an arithmetic logic unit (ALU) 30. The line sum accumulator 26 further includes a RAM 32 which may be a variable length shift register. Ram 32 functions as a left edge memory. Both ALU 30 and memory 32 receive the single level data outputted by comparator 22. Memory 32 stores the pixel values at the points on the vertical line currently being scanned. As the pixel value commensurate with each new point is received, it is added by ALU 30 to the last sum, i.e., the sum of the previous vertical scans, and the left edge pixel is subtracted from the sum. The output of ALU 30 is fed back to the input of the line sum memory 28 and the new value is written in to replace the previous value. Memory 28 is also connected to bus 18 and thus receives the current "Y" coordinate address information.

During the first sweep of the image, the output of the line sum RAM 28 is set to zero for initialization. As the data commensurate with each new point on the 512 scan lines is received, it is written into RAM 32 and the left edge point, which is at the current address minus the window width, is read. The output of RAM 32 will be set to zero until the sweep count is equal to the line sum window width. This results in the left side of the image being forced to be "white". The address information for the left edge memory 32 is produced by a left edge address calculator 34. Left edge address calculator 34 comprises a circuit which generates an address to write the current pixel and an address to read the left edge pixel. The difference between these two values is equal to the window width times 512. Left edge address calculator 34 is connected to the current "X", "Y" bus 18 and thus receives the current address information. Left edge address calculator 34 is also connected to a window width signal generator 36 which provides the preselected line sum, i.e., window, width value. The line sum width may be set to any value from 1 to 128 sweeps. The outputs of left edge address calculator 34 are the write address for the current pixel and the read address to retrieve the left edge pixel. This address information is delivered to memory 32 via a multiplexer 38.

As line sums are accumulated in memory 28, they are also sent to a correlator for pattern matching. Thus, the 8-bit line sum appearing at the output of ALU 30 is converted to a 1-bit signal by a threshold comparator 40. The threshold information is preset and delivered to comparator 40 via a threshold signal generator 42. The output of comparator 40 is thus a real time binary profile of the captured image of the envelope being scanned. The correlator, indicated at 44, comprises a commercially available device such as a TWR part number TMC2221 and an associated pattern storage memory 46. In the known manner, the correlator matches a stored pattern to an unknown pattern and generates a numeric output commensurate with the degree of match. The stored correlator patterns are preset and are based upon the fact that the vertical resolution of the system is, in one reduction to practice, 200 pixels per inch relative to the vertical spacing of the lines of a typical address; i.e., six lines per inch. Thus, the stored correlator patterns match the expected vertical pitch of the address block. As noted, the correlator 44 outputs a numeric value based upon how well the input pattern, as received from comparator 40, matches the patterns stored in memory 46. The output of correlator 44 is delivered to a peak score capture circuit 48 which may, for example, comprise a comparator, a storage register and associated control logic. The peak score capture circuit 48 captures two peak scores and, by virtue of its connection to bus 18, the corresponding "Y" address coordinates. The two captured peak scores must be separated by some minimum distance. The information in peak score capture circuit 48 is employed by a microprocessor 50 to determine the location of potential address blocks.

As the video data sweeps are processed, microprocessor 50 receives four values for each sweep. These values are the "Y" coordinate and peak score for two positions during the sweep. The microprocessor stores these four values sequentially in a table in RAM. The size of this table is four times the maximum number of sweeps. Since the maximum number of sweeps is 2048 in the embodiment being described, the table is a block of RAM memory 8192 words long. When the microprocessor goes back to analyze the contents of this table, it can determine the "X" address of a particular point by taking the table address of the point and dividing by four.

It is to be noted that, in actual practice, a dynamic reloading technique is employed so that a plurality of possible patterns may be compared with the input pattern through the use of a single correlator. In one reduction to practice, sixteen correlator patterns were stored in pattern storage memory 46, which was a FIFO, and the correlator pattern was reloaded in the correlator 44 on successive sweeps on a rotating basis. By way of example, if there are eight active correlator patterns, then each pattern will be checked every eight sweeps. Since the line sum values change slowly, they do not have to be tested on every sweep.

The microprocessor 50 includes a RAM and executes a program which resides in a ROM 52. Microprocessor 50 supervises operations of the address block locator, calculates values and records potential address block locations. Microprocessor 50 also selects one of the potential address block locations for output and starts the output process.

In order to begin the output process, the microprocessor will select the output sub-window and initialize the output window "X" and "Y" addresses as provided by address generators 56 and 58. Microprocessor 50 will also start the output sequencer 54 which will, by incrementing the "X", "Y" addresses, transfer the window from buffer memory 10 to the line memory of a downstream OCR system. The output window will be a block of data defined by the downloaded parameters and will, for example, be transferred at a 6.25 MHz clock rate. As long as the output process is started before the next image input has started, the input process cannot overlap the output. Since the address block location may be anywhere in the input window, the output process will white-fill any areas of the output window that extend beyond the page memory edges to the right or above. No provision is made to white-fill below the bottom of page memory since an output window that extends below the bottom edge will never be specified.

In operation of the above-described address block locator, all registers are initialized and the system operating parameters, such as line sum window width and threshold values, will be set. Also, the correlator pattern storage memory 46 is loaded with the data patterns to be detected. Once this initialization is completed, the address block locator may begin processing video images and, in the course of so doing, will be transparent to the downstream OCR system. Thus, the sweep converter of the downstream system receives images from the address block location logic which appear to be coming directly from the image acquisition device. The address block location logic will accept data from the image acquisition device until the capture is about one inch from the right edge of the envelope. At this point, a predetermined additional number of sweeps will be loaded. In no case will the number of captured sweeps exceed a preselected number which, in a typical case, will be 2048. A signal will then be sent to the image acquisition device to stop the generation of the video input. Once an address block has been located, the address block location logic will transfer the sub-window to the downstream OCR system and, when the transfer is completed, send an enabling signal to the image acquisition device so that the next capture may begin.

Since mixed envelopes have different widths, the address block location logic must be able to detect the right edge of the envelope being scanned. This is accomplished by detecting a photocell signal from the document transport indicating that the envelope has passed a predetermined point upstream of the image acquisition device. Using a downloaded sweep delay parameter, the microprocessor 50 will determine when the capture is approximately one inch before the right edge. At this time, the microprocessor must decide which address block to output and initiate the transfer process.

The operation of the address block locator is based upon detecting the periodic vertical structure of the lines of printing in the address block. This event is indicated by the strength of correlation to a reference pattern of similar periodicity. Since the correlator reference is designed to produce a peak score when it is aligned with the last line of the address, it is the "Y" position of the last line that should be noted for the current scan. The peak score and "Y"-address capture circuit 48 can be interrogated under microprocessor control at the end of each vertical sweep to determine the highest correlator output and corresponding vertical position within the scan. These data are then used as part of an object descriptor to characterize each potential address block.

As discussed above, in a preferred embodiment the circuit 48 captures the highest two correlator output values and their associated "Y" positions on each sweep. An internal counter is employed to require that the two captured peaks be separated by some minimum distance. Assuming two peak scores and associated "Y" positions per scan, microprocessor 50 will first qualify a peak score as sufficiently large to indicate the presence of a periodic structure. The microprocessor will then make a decision as to whether such events on successive scans belong to contiguous objects of the characteristic extent of an address field. The first scan on which a peak score event exceeds the assigned event threshold for that correlator pattern, and whose "Y" position is not similar to that of an object already present on the previous scan, will cause a new object descriptor record to be opened. At the scan which first exceeds the correlator event threshold and opens a new object, it is extremely likely that the true left edge of the new object is within the horizontal extent of the line sum memory. Since the length of the transmitted address block is significantly longer than the address, some white spaces is permitted on the left side of the transmitted window without cutting off the right-hand end of the address. It is therefore adequate to assign the left edge of the transmitted window to be at an "X" position that is the length of the line sum memory to the left of the scan on which the object opened.

Upon opening, the object descriptor record contains the left edge position (X), the opening event "Y" position, the opening event peak score, a horizontal extent equal to the length of the line sum memory, and the type of correlator pattern that caused the object descriptor record to be opened. Following scans that produce peak scores that exceed threshold on the same correlator pattern, and whose "Y" positions are within a small distance from the recorded "Y" position, are considered to extend the contiguous object. Peak score and "Y" position are updated to reflect a peak score for the entire object and the lowest "Y" position encountered. This lowest "Y" position will subsequently be offset by a value which is unique to the correlator pattern being used thereby resulting in the "Y"-address of the bottom of the address block. Each scan producing a continuous peak score event increments the horizontal extent. An object closes when the peak score fails to exceed the event threshold.

When an object closes, further calculations are done to compare it to the other candidates for the most likely address field. First, the horizontal extent is multiplied by a parameter specific to the type of correlator pattern used. This parameter converts the horizontal extent into an approximate number of characters based on the vertical pitch encountered. This value is used as an index into a table which provides a weighting curve for object extent. The shape of the weighting curve is small when the extent is shorter than a few characters, rises to unity for "normal" length addresses and then falls slowly as the extent becomes implausibly long.

A second parameter specific to each correlator pattern is a peak score multiplying factor. The primary purpose of this factor is to compensate for the number of "don't care" bits in each correlator mask or pattern. For example, if a given pattern has forty masked bits, then a score of 88 (not the full 128) would be a perfect match. This same factor can also be used to de-emphasize certain reference patterns such as a "blob pattern", which is less attractive as an address block identifier than the usual periodic structures of 3, 6, 8 or 10 lines per inch. The resulting "normalized score" is used as an index into a lookup table to obtain the score weight.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for locating a block of printed indicia on a page comprising:

scanning an area comprising at least a portion of the page and generating a data stream commensurate with results of the scanning, the page being scanned in a pair of mutually orthogonal directions, the data comprising the stream corresponding to the presence or absence of indicia on the page;

storing in a first memory data comprising the data stream and address information corresponding to the location within the scanned area of the page where the data being stored originated;

further storing in a second memory the data comprising the data stream which originates from within a subsection of the scanned area of the page which is smaller than the area being scanned, the subsection being caused to move relative to the page to thereby define a moving window, data stored in the second memory being commensurate with printed indicia located within the moving window;

generating a real time binary profile of the data stored in the second memory;

comparing the generated binary profile with each of a plurality of prerecorded binary profiles commensurate with the type of indicia to be located and generating a running score of numeric values commensurate with the results of the comparisons;

recording the generated numeric values and address information indicative of the location in at least one of the directions of scanning where the data corresponding to each numeric value originated; and transferring a block of stored data corresponding to a preselected size field within the scanned area from the first memory, the location of the block of data to be transferred being determined by the recorded addresses corresponding to recorded numeric values which satisfy preselected criteria, the transferred data being further processed.

2. The method of claim 1 wherein the step of generating a binary profile of the data stream comprises:

summing the data for points along scan lines in a first of said mutually orthogonal directions for the length of each scan line in said first direction which corresponds to the width of the moving window.

3. A method of claim 2 wherein the page is caused to move in a first direction while being scanned in the second of said mutually orthogonal directions whereby data is collected at points defining an X-Y matrix with the dimensions of said moving window.

4. The method of claim 3 wherein the page is an envelope and the block of data to be located comprises an address, wherein the first direction is the "X" direction and the second direction is the "Y" direction, and wherein the step of generating a binary profile of the data stream further comprises:

comparing the summed data in the "X" direction with a threshold value and generating a binary signal commensurate with whether the instantaneous sum is greater or less than the threshold value.

5. The method of claim 4 wherein the step of generating a binary profile of the data stream further comprises:

generating a signal commensurate with said length of each scan line in the "X" direction which corresponds to the width of the moving window;

additionally storing the data provided during scanning for each scan line in the "X" direction for a number of scans in the "Y" direction determined by the window width signal; and subtracting the oldest of said additionally stored data from the summed data as new data for each corresponding "X" direction scan line is received, the new data being simultaneously added to the previously determined sum.

6. Apparatus for locating a block of data comprising address information, the address information being visible on a first side of an envelope which is moving in a first direction on a transport past a camera, the camera scanning the envelope in a second direction which is generally transverse to said first direction whereby at least an area of the envelope is scanned, the camera serially providing bits of data commensurate with the presence or absence of indicia at points along the lines scanned by the camera, said points defining lines extending generally in said first direction, said apparatus comprising:

first memory means for receiving and storing the data comprising the data stream provided by the camera;

means providing address information commensurate with the points of origin of the data comprising the data stream in a coordinate system defined by said first and second directions, said address information being delivered to said first memory means to determine the storage locations in said first memory means for said data;

means providing a signal commensurate with a preselected distance in said first direction, said distance signal defining a first dimension of a window having a preselected size, said window having an area which is less than said area of the envelope which is scanned, said window moving relative to the envelope during scanning;

line sum accumulator means for generating a real time binary profile of the data stream commensurate with indicia located within said moving window area, said line sum accumulator means being responsive to said data stream and to address information from said address information providing means, said line sum accumulator means also being responsive to said preselected distance signal;

means for comparing the generated binary profile with a plurality of prerecorded binary profiles of representative blocks of address information, said comparing means producing numeric values which comprise a running score commensurate with the results of the comparisons;

means coupled to said comparing means and responsive to said numeric values for generating an initial transfer address corresponding to the storage location in said first memory means of a point which defines the perimeter of a block of address information, said point being commensurate with preselected numeric values satisfying predetermined criteria; and means responsive to said initial transfer address for initiating the reading of data from said first memory means, the data read from said first memory means having been stored at storage locations commensurate with a field having a predetermined size in each of said first and second directions, said block of address information lying within said field.

7. The apparatus of claim 6 wherein said means for comparing comprises:

means for storing said plurality of precorded binary profiles;

correlator means for receiving said real time binary profile and comparing the received data with said prerecorded binary profile data to produce said numeric values; and means for storing the numeric values produced by said correlator means, said numeric value storing means also receiving address information from said means providing address information, the numeric values being stored with corresponding address information.

8. The apparatus of claim 7 wherein said line sum accumulator means comprises:

means for summing received data for points along scan lines in said first direction for a predetermined number of camera scans in said second direction, the number of camera scans in said second direction being determined by said preselected distance signal; and means responsive to said summed line data and to a threshold value for generating a binary data stream commensurate with a real time profile of the received data.

9. The apparatus of claim 8 wherein said means for generating an initial transfer address comprises:

data processor means, said processor means establishing a table of sequentially produced numeric values with corresponding addresses, the initial transfer address being determined from the information in said table, said processor means subsequently causing the initial transfer address to be incremented to read the entire address from said memory means.

10. The apparatus of claim 6 wherein said line sum accumulator means comprises:

means for summing received data for points along scan lines in said first direction for a predetermined number of camera scans in said second direction, the number of camera scans in said second direction being determined by said preselected distance signal; and means responsive to said summed line data and to a threshold value for generating a binary data stream commensurate with a real time profile of the received data.

11. The apparatus of claim 6 wherein said means for generating an initial transfer address comprises:

data processor means, said processor means establishing a table of sequentially produced numeric values with corresponding addresses, the initial transfer address being determined from the information in said table, said processor means subsequently causing the initial transfer address to be incremented to read the entire address from said memory means.

* * * * *